United States Patent Office 3,506,617
Patented Apr. 14, 1970

3,506,617
POLYURETHANES FROM POLYADIPATES, BIS-(4-ISOCYANATOCYCLOHEXYL) - METHANE, AND 1,2-DIAMINOPROPANE
Georges Collardeau, Saint-Fons, and Jean Robin, Lyon, France, assignors to Rhone-Poulenc S.A., Paris, France
No Drawing. Filed July 26, 1966, Ser. No. 567,832
Claims priority, application France, July 28, 1965, 26,342; June 22, 1966, 66,489
Int. Cl. C08g 22/04, 22/24
U.S. Cl. 260—75                                    2 Claims

ABSTRACT OF THE DISCLOSURE

The invention provides novel polyurethans obtained by reacting a diphydroxy polyester with bis(4-isocyanatocyclohexyl)-methane to produce a polymer containing terminal isocyanate groups, and then reacting the latter polymer with 1,2-diaminopropane. The polyurethanes so made have valuable mechanical properties and good resistance to light and chemical agents.

---

This invention relates to polyurethans and more specifically to polyurethans of great value for their elastomeric properties and their resistance to light and chemical agents.

Elastomeric polyurethans have been prepared by reaction of a linear polyester, of low molecular weight, containing terminal hydroxyl groups, with an organic diisocyanate, followed by reaction with a coupling agent, which contains two functional groups, for instance, a diol, a diamine or an amino alcohol.

Considerable investigation has been carried out in varying the chemical structure of the polyester, the diisocyanate, and the coupling agent, in order to improve the properties of the final products. Although some progress has been made, the polyurethans known in the art, have a too low melting point or are not sufficiently resistant to light and to chemical agents, and in general are far from being satisfactory for application in fibers and films. For instance aromatic diisocyanates give products which become yellowish on exposure to light and require the addition of a stabilizer. Aliphatic diisocyanates are more resistant to light, but give products with low melting point, which soften rapidly on heating, and which require the use of certain coupling agents that raise the melting point of the polyurethan in order to overcome this deficiency.

An object of this invention is to provide novel polyurethans which exhibit increased stability to sunlight and ultra violet light and improved mechanical properties, and which are very suitable for the preparation of filaments, films and varnishes.

Another object is to provide a process for the preparation of clear solutions, not only dilute solutions, but also in solutions of concentration higher than 20%.

Still another object is to provide polyurethans which are suitable for the preparation of varnishes with incorporation of suitable pigments.

Still another object is to prepare polyurethans which are stable to chemical agents and particularly to oxidizing agents such as chlorinated water.

The crux of this invention resides in the finding that superior products are obtained by the use of bis-(4-isocyanatocyclohexyl)-methane for the reaction with a dihydroxy polyester, so as to form a macrodiisocyanate and to react the macridiisocyanate with the 1,2-diaminopropane.

The macrodiisocyanate prepolymer which is coupled with the diamine is obtained from the reaction of bis-(4-isocyanatocyclohexyl)-methane with a low molecular weight dihydroxy polyester. More specifically, the polyester has a molecular weight comprised between 700 and 3500, preferably between 1400 and 2500, and a melting point of at most 60° C. The polyester is obtained from the condensation of an aliphatic dicarboxylic acid with a diol.

As the dicarboxylic acid, there may be mentioned succinic, glutaric, adipic, pimelic, suberic, azelaic, sebacic acid. The aliphatic chain may be substituted by a limited number of methyl groups. Mixtures of these acids as well as of their methyl substitution products may be used.

As the diol, 1,2-ethanediol, 1,2-propanediol, 1,3-propanediol, 1,2-, 1,3- and 1,4-butanediol, pentanediols, particularly the 1,5-pentanediol, 1,6-hexanediol, 1,7-heptanediol, 1,8-octanediol, 1,10-decanediol, and 2,2-dimethyl-1,3-propanediol, and mixtures of diols may be used. For instance, it is posible to condense adipic acid with 1,2-ethanediol, or with a mixture of the later and 1,2-propanediol. It is also possible to condense adipic acid with a mixture of 1,6-hexanediol and 2,2-dimethyl-1,3-propanediol. The condensation product from 1,2-ethanediol and a mixture of succinic and adipic acid is also satisfactory.

The mechanical properties of the products, such as tensile strength, elongation to rupture load required for 100% elongation, residual elongation, all vary according to the molecular weight of the polyester and whether mixtures of dicarboxylic acids and diols are used. Other properties, however, such as stability to light and to oxidizing agents, are not affected and remain essentially the same in spite of variation in the molecular weight of the polyester and the chemical structure of the acid and the diol. Particularly desirable is the polyester from adipic acid and a mixture of 1,6-hexanediol and 2,2-dimethyl-1,3-propanediol, in the ratio between 60:40 and 90:10 of the former diol to the latter.

For the bis-(4-isocyanatocyclohexyl)-methane the product by reaction of phosgene with bis-(4-aminocyclohexyl)-methane may be used. The product is a mixture of isomers, in which the trans-trans and cis-trans isomers are present in the proportion of between 60 and 80 parts of the former and between 40 and 20 parts of the latter. The cis-cis isomer is present in negligible amount.

The reaction between the bis-(4-isocyanatocyclohexyl)-methane and the dihydroxy polyester is conducted by reacting the substances in the ratio of between 1.5 and 2.5 moles, preferably 2 moles of the former, to one mole of the latter. According to the preferred embodiment of the invention, the reaction is conducted at a temperature not exceeding 150° C., preferably between 100° and 130° C., and if desired in the presence of an anhydrous and inert solvent, for instance toluene, for a period of time sufficient to complete the reaction of at least 95% of the total hydroxyl groups.

The coupling agent between the molecules of the macrodiisocyanate is performed by adding to the solution of the macrodiisocyanate, the 1,2-diamino propane, preferably as a solution in a solvent that is inert under the conditions of the reaction. It is advantageous to add a small quantity of an aliphatic monoamine, preferably of a boiling point lower than 180° C. at atmospheric pressure. The total amount of diamine and optionally monoamine used, corresponds to the unreacted isocyanate groups or is slightly in excess, that is, it corresponds to between 100 and 105% of the unreacted isocyanate groups, introduced with the macrodiisocyanate, with the monoamine representing, at the most, 5% of the total amino groups present.

The coupling reaction is preferably carried out in rather dilute form in a solvent, such as dimethyl formamide, dimethyl acetamide, dimethyl sulfoxide, tris-(dimethylamino)-phosphineoxide, or a mixture of these solvents.

The elastomeric polyurethans prepared as described in this application, may be utilized in many ways, especially for the preparation of elastic fibers and films. For these uses the polymer is used preferably in the form of a solution, as described above. When the solvent is dimethyl formamide, and the concentration of the polyurethan is higher than 20%, the polyurethan does not go completely in solution, but gives a thixotropic dispersion. On the other hand, dimethyl formamide is the solvent frequently chosen with polyurethans because at a later stage, it may be evaporated to completion. It has now been found, surprisingly, and this is another feature of this invention, that, with the concentration of the polyurethan above 20%, it is possible to avoid the formation of thixotropic dispersion by application of the following procedure. The coupling reaction is carried out not in pure dimethyl formamide but in dimethyl formamide to which has been added a small amount of lithium chloride. More specifically, there is added to dimethyl formamide, lithium chloride in an amount of between 0.2 and 5% of the weight of dimethyl formamide. At the end of the reaction, the reaction mixture is concentrated, under vacuum to evaporate the toluene and a part of the dimethyl formamide, until the desired concentration of the polyurethan is obtained. In this manner, clear and homogeneous solutions are obtained even with concentrations above 20%.

If more dilute solutions are suitable for further use, for instance those containing between 10 and 20% of the polyurethan, the addition of lithium chloride is not necessary. With solutions of 15–20% elastomer a simple heating operation to 50–60° C. may be necessary in order to obtain and preserve their fluidity. In this manner elastic filaments can be prepared by wet spinning.

According to the final use being contemplated, different additives may be added to the solutions or to the thixotropic dispersions. For instance, white pigments such as titanium dioxide, or colored pigments may be added without affecting the properties of the polymer.

The elastic filaments produced from the elastomeric substances prepared in accordance with this invention, are outstanding for their elastic properties, their resistance to chemical agents and light, and are very useful in the textile industry, for the manufacture of elastic articles which satisfy the most diversified requirements: for instance resistance to the chlorinated water of swimming pools, to gases of combustion present in the city atmosphere, and which are also outstanding in their resistance to perspiration.

The preparation of the polyurethans of this invention is illustrated by the following examples, of which examples 1 through 6 represent polyurethans in dimethyl formamide solution of concentrations lower than 20%, and examples 7 and 8 represent polyurethans in solution of concentrations higher than 20%. They are not limited but illustrate in more detail the preparation, the uses and the properties of the novel elastomers.

EXAMPLE 1

240 p. toluene and 238 g. (0.15 moles) of a polyester obtained by esterification of 1.2-ethanediol with adipic acid (molecular weight 1590, hydroxyl number 69.8, acid number 0.6) are placed into a one liter Pyrex flask. The mixture is dried azeotropically by distillation of 100 g. of toluene. To the solution, while still warm, there is added 78.6 g. (0.3 mole) of bis-(4-isocyanatocyclohexyl)-methane dissolved in 100 g. anhydrous toluene. The diisocyanate contains 70% of the trans-trans isomer and 30% of the cis-trans isomer; m. 62°–65° C.; hydrolyzable chlorine content: lower than 0.2%. The mixture is refluxed for three hours with agitation, then cooled to room temperature.

Eighty-eight grams of the prepolymer solution with terminal isocyanate groups obtained above, together with 187 ml. anhydrous dimethyl formamide, are placed in a Pyrex cylindrical vessel of 500 ml. capacity, kept under an atmosphere of dry nitrogen. A solution of 2.05 g. of 1,2-diaminopropane hydrate (analysis 89.2%) in 98 ml. anhydrous dimethyl formamide is added under good stirring, over a period of 30 minutes, followed by 2.0 ml. of a solution containing 6.58 g. dibutylamine in 100 ml. anhydrous dimethyl formamide.

There is thus obtained an homogeneous solution of the polyurethan which by casting at a thickness of 0.5 mm. gives a film which is dried in air at 120° C. for one hour, and is reheated one more hour at 120° C. The film then obtained exhibits the following properties:

Tensile strength—697 kg/cm.$^2$
Elongation to rupture—707%
Load required for 100% elongation:
 At 25° C.—63.7 kg./cm.$^2$
 At 150° C.—29.4 kg./cm.$^2$
Residual elongation after 300% elongation—30%
Softening point—220° C.

The mechanical properties stated in this example and in the following examples are expressed in terms of the standard AFNOR T46.002.

The stability of the film to light is measured by the apparatus known as "Xenotest 450." In this apparatus, the film is subjected to irradiation with a Xenon lamp, which gives a spectrum of a composition close to that of sunlight. After 200 hours exposure, the film is still as white as a sample of the same film kept as a control and not subjected to irradiation.

EXAMPLE 2

The solution of the prepolymer which contains terminal isocyanate groups is prepared as in Example 1. To 88 g. of the solution are added 187 ml. of a mixture of dimethyl formamide and dimethyl sulfoxide in the ratio (by weight) of 90:10, and then, under good stirring, there is added in the course of 30 minutes, a solution of 2.05 g. of 1,2-diaminopropane hemihydrate in 98 ml. of the same solvent mixture, in the same ratio 90:10 followed by 2 ml. of a solution containing 6.58 g. of butylamine in 100 ml. of dimethyl formamide.

The solution thus obtained is diluted with an additional 38 g. of a solution of dimethyl formamide and dimethyl sulfoxide, in the ratio 90:10, which is an amount equal to the toluene present in the solution. The toluene is then evaporated under vacuum at a pressure of 10 mm.

Titanium dioxide is added to the resulting solution, which contains about 15% by weight of the polymer, in an amount of 5% of the weight of the polymer. The colloid is heated to 60° C., and extruded into a coagulating bath consisting of a mixture of water and dimethyl formamide (in the proportion of 80:20 by weight) at a temperature of 85° C., through a spinnerette having 13 orifices of 9/100 mm. diameter. The resulting fiber is 135 denier, and after washing and drying at 105° C., has tenacity of 0.69 g./denier and elongation at rupture of 740%. The whiteness and the mechanical properties of the fiber remain unchanged after 200 hours exposure to the "Xenotest 450."

EXAMPLE 3

The same molar proportions of reagents are used as in Example 1, but the polyadipate is a mixture of the polyadipates from 1,2-ethanediol and 2,2-dimethyl-1,3-propanediol, with a molecular weight of 1630, acid value 0.8 and hydroxyl value 68, prepared by esterification of a mixture of the diols in the ratio 80:20. From the colloidal solution, a film is prepared as indicated in Example 1.

This film exhibits the following properties:

Tensile strength—819 kg./cm$^2$
Elongation to rupture—815%
Load required for 100% elongation:
 At 25° C.—87.2 kg./cm$^2$
 At 150° C.—30.4 kg./cm$^2$
Residual elongation after 300% elongation—33%
Softening point—200° C.

The film exhibits no yellowing after 200 hours exposure to the "Xenotest 450."

EXAMPLE 4

The same procedure as in Example 1 is followed, but the polyester is a mixture of polyadipates from 1,6-hexanediol and 2,2-dimethyl-1,3-propanediol, of mol. wt. 1800, acid value 1.5, hydroxyl value 60.6, prepared from a mixture of the diols, in the molar ratio 80:20.

The resulting solution, additionally containing titanium dioxide in the amount of 5% of the weight of the polymer, is used to prepare a film, as described in Example 1, which exhibits the following properties:

Tensile strength—588 kg./cm$^2$
Elongation to rupture—578%
Load required for 100% elongation:
  At 25° C.—62.8 kg./cm.$^2$
  At 150° C.—35 kg./cm.$^2$
Residual elongation after 300% elongation—20%
Softening point—213° C.

The same solution containing titanium dioxide is also used to manufacture elastic fibers. For this purpose, the solution is heated to 60° C., passed through a spinnerette of 32 orifices of 8/100 mm., and spun out into a coagulating bath consisting of a mixture of water and dimethyl formamide in the ratio, by weight, of 80:20 at 85° C. The resulting fiber, after washing and drying at 105° C., exhibits the following properties:

Titer—450 denier
Tenacity—0.65 gram/denier
Elongation to rupture—800%

The film and the fiber indicate no yellowing after 200 hours exposure to the "Xenotest 450."
e14.41cinl-Xbjsaae4a,4  a$^2$H'

The fibers obtained from the polymer as described above have additionally been subjected to several tests which allow the evaluation of their properties under conditions of practical application, particularly in an atmosphere polluted with gases from the combustion of coal, of manufactured gas, of gasoline, as well as their resistance to perspiration and to chlorinated water. The tests selected for these determinations are called "stability to oxides of nitrogen," "stability to perspiration," "stability to chlorinated water," which are described in the "Code de Solidite" (Stability Code) 2nd ed. (1958) and the 1963 supplement, entitled "Methods de determination de la solidite des teintures et impressions sur textiles" (methods for the determination of the stability of dyeing and printing on textiles), edited by the "Association for the Study and Publication of Methods for the Determination of Stability."

The different tests are conducted as follows:

(a) Stability to oxides of nitrogen

In this test, skeins of 4–5 cm. in length, prepared with a filament of 140 denier, are exposed to the action of a mixture of oxides of nitrogen and air in a closed container. After three treatments, as indicated, the fiber retains practically its original whiteness. On the other hand, a fiber of the same titer based on a polymer from a polyadipate of 1,2-ethane diol and 1,2-propanediol/bis-(4-isocyanato-phenyl)-methane/hydrazine, exposed to the same oxide of nitrogen air mixture, acquires a brown tinge, even after the first treatment.

(b) Stability to perspiration

This test is conducted by immersing skeins of 4–5 cm. length, prepared from a fiber of 465 denier, in two solutions of histidine kept at pH 8 and pH 5.5 respectively, for a period of 4 hours, at 37° C. After spin drying and drying at a temperature not exceeding 60° C., the filament remains white, in both the acidic and the alkaline medium. On the other hand, a filament of the same titer, based on the polyadipate 1,2-ethanediol and 1,2-propanediol/bis-(4-isocyanatophenyl) - methane/hydrazine, becomes yellow, under the same conditions, in both the acidic and the basic solution of histidine.

(c) Stability to chlorinated water

This test is conducted by immersing the fiber for a period of four hours, at 20° C., in a solution of sodium hypochlorite in distilled water, with an active chlorine content of 20 mg./l. at a pH of 8.5, and determining the color change. The fiber consisting of the polymers prepared according to the above example remains perfectly white.

EXAMPLE 5

The table below summarizes the mechanical properties of several polyurethans prepared according to this invention and specifically the films obtained by casting the respective polymer solutions at 0.5 mm. Polyester A represents polyurethans from 1,2-ethanediol polyadipate, prepared according to Example 1, and Polyester B represents polyurethans from 1,6-hexanediol polyadipate and 2,2-dimethyl-1,3-propanediol polyadipate, prepared according to Example 4. The molecular weight of the polyester moiety varies with each experiment. The properties of the films prepared according to Examples 1 and 4 are also included in the table.

TABLE 1

| Type of the polyester | A | B | A | B | A | B | A |
|---|---|---|---|---|---|---|---|
| Molecular weight of the polyester | 1,370 | 1,440 | 1,590 | 1,800 | 2,000 | 2,030 | 3,390 |
| Tensile strength in kg./cm.$^2$ | 622 | 670 | 697 | 588 | 651 | 642 | 573 |
| Elongation to rupture, percent | 632 | 595 | 707 | 578 | 669 | 700 | 757 |
| Load for 100% elongation at 25° C. (kg./cm.$^2$) | 79.6 | 77.5 | 63.7 | 62.8 | 57.3 | 57 | 29.4 |
| Load for 100% elongation at 150° C.(kg./cm.$^2$) | 29 | | 29.4 | 35 | 25.4 | | 15 |
| Residual elongation after 300% elongation, percent | 48 | 30 | 30 | 20 | 30 | 18 | 135 |

EXAMPLE 6

Ninety-one and sixty-five tenths grams (0.05 mole) of a polyester (hydroxyl value 59.6, acid value 1.5, molecular weight 1833) obtained by esterification of adipic acid with a mixture of 1,6-hexanediol and 2,2-dimethyl-1,3-propanediol, in the molar ratio of 80:20, are reacted with 26.2 g. (0.1 mole) of bis-(4-isocyanatocyclohexyl-methane, the mixture containing 70% trans-trans isomer and 30% cis-trans isomer, by refluxing in 82.5 grams toluene, for a period of two hours. 103 ml. dimethyl formamide is added to a portion of 44 g. of the solution so prepared, and a solution of 0.870 g. 1,2-diaminopropane hydrate (titer 93.6%) in 39.5 cc. of dimethyl formamide is added over a period of 30 minutes, under efficient stirring. The amount of diamine corresponds to a 0.2% excess.

The resulting polymer has specific viscosity of 0.247, in a 2% dimethyl formamide solution. The film obtained by casting the solution at a thickness of 0.6 mm. after drying two hours at 120° C., has the following properties:

Tensile strength—605 kg./cm.$^2$
Elongation to rupture—620%
Load for 100% elongation:
  At 25° C.—52.2 kg./cm.$^2$
  At 150° C.—25.5 kg./cm.$^2$
Residual elongation after 300% elongation—15%
Softening point—205° C.

By spinning the solution, after addition of titanium dioxide in the amount of 5% of the weight of the polymer, in the same manner as in Example 4, the resulting fibers exhibit properties identical to the fibers obtained in Example 4.

EXAMPLE 7

Fifty-six and six tenths g. of the mixed polyadipates from ethylene glycol and 1,2-propanediol in the ratio 80:20, of a molecular weight 1700, and 17.5 g. bis-(4-isocyanato-cyclohexyl)-methane, (the mixture 65:35 of trans-trans and cis-trans isomer), in 56.6 g. toluene, are placed in a 250 cc. flash, provided with a reflux condenser. After refluxing 2 hours, the reaction mixture is allowed to cool, then 44 g. of this mixture are placed in a 250 ml. vessel, and 73 ml. dimethyl formamide, containing 0.5% by weight of lithium chloride are added to put it in solution.

In a separate vessel, a solution of 0.895 g. 1,2-propane diamine hydrate (90% titer) in 39 ml. dimethyl formamide, containing 0.5% by weight of lithium chloride is prepared. A portion of 38 cc. of this solution is added gradually to the prepolymer solution under stirring, over a period of 30 minutes. Then 2 ml. of a solution of 0.397 g. butylamine in 9.5 ml. dimethyl formamide, which contains 0.5% by weight of lithium chloride are added. The final solution is clear and homogeneous, has a viscosity of 20 poises, and a dry extract content of 17.4%.

By casting a portion of the solution at a thickness of 0.5 mm., a film is obtained, which after drying in hot air for one hour at 120° C., and reheating one more hour at 120° C., has a thickness 9/100 mm., and softening point of 210°–220° C. The mechanical properties in terms of the standard AFNOR T46.002 are: tensile strength, 500–600 kg./cm.$^2$; load for 100% elongation: 60 kg./cm.$^2$ at room temperature, and 20 kg./cm.$^2$ at 150° C.; elongation to rupture: 600–700%.

The remainder of the solution is concentrated under vacuum, from a dry extract content of 17.4% to one of 25%. The solution thus obtained is also clear, has a viscosity of 500 poises, and is suitable for the manufacture of fibers, by extrusion in a coagulating bath, of water and dimethyl formamide in the ratio 80:20. The resulting fibers are washed and dried according to conventional methods. The fibers are tested for fastness to light by exposure to ultraviolet light, in the "Xenotest 450," apparatus. After 425 hours, the fibers show no yellowing, and are comparable to fibers kept as a control, and not submitted to the test.

EXAMPLE 8

The Example 7 is repeated by first reacting 78.5 g. of ethylene glycol polyadipate, molecular weight 1750, and 26.2 g. bis-(4-isocyanatocyclohexyl)-methane, in a solution of 73.3 g. toluene.

A portion of 55 g. of the above solution is diluted with 101 ml. dimethyl formamide, containing 0.5% lithium chloride. A solution of 1.246 g. of 1,2-diaminopropane in 39.5 ml. dimethyl formamide containing 0.5% lithium chloride is added under stirring, until 38 ml. have been added. Then 2 ml. of a solution prepared from 0.552 g. butylamine in 9.5 ml. dimethyl formamide containing 0.5% lithium chloride, is added. The resulting solution is clear, homogeneous, and the viscosity is 20 poises. The dry extract content is 17–18%.

By casting this solution as described in the preceding example, films are prepared which have a softening point of 220° C. and tensile strength of 700 kg./cm.$^2$. The load for 100% elongation is 65–70 kg./cm.$^2$ at room temperature, and 30–35 kg./cm.$^2$ at 150° C. The elongation to rupture is 700%.

The solution may be concentrated until the concentration is 26%. The solution so obtained may be spun by the dry spinning method, giving fibers of a titer of 70 denier, tenacity of 0.80 g./denier and elongation of 600%. The resistance to light, tested in the "Xenotest" apparatus, is greater than 400 hours, the fibers showing no yellowing after exposure for this period of time. On the contrary, fibers prepared from polyethylene glycol, bis-(4-isocyanatophenyl) methane and ethylene diamine begin yellowing after 96 hours. This test unequivocally shows the superiority of the polyurethane prepared from bis-(4-isocyanatocyclohexyl)-methane, as compared with the corresponding aromatic compound.

Although only eight examples have been described in detail herein, those skilled in the art will readily appreicate that several modifications of the molecular weight of the polyester and chemical structure of the polyester may be made without departing from the spirit of the invention, which is limited only by the scope of the appended claims.

What is claimed is:

1. A polyurethane which is the product of coupling of (a) a polymer containing terminal isocyanate groups which is obtained by the reactions of one mole of the mixed polyadipate of 1,2-ethanediol and 1,2-propanediol with from 1.5–2.5 moles of bis-(4-isocyanatocyclohexyl)-methane and (b) an aliphatic diamine which is 1,2-diaminopropane.

2. A polyurethane which is the product of coupling of (a) a polymer containing terminal isocyanate groups which is obtained by the reactions of one mole of the polyadipate of 1,2-ethanediol with from 1.5–2.5 moles of bis-(4-isocyanoatocyclohexyl)-methane and (b) an aliphatic diamine which is 1,2-diaminopropane.

References Cited

UNITED STATES PATENTS

| | | |
|---|---|---|
| 2,650,212 | 8/1953 | Windemuth. |
| 2,755,266 | 7/1956 | Brenschede. |
| 2,917,486 | 12/1959 | Nelson et al. |
| 2,929,800 | 3/1960 | Hill. |
| 3,036,878 | 5/1962 | Polansky. |
| 3,068,188 | 12/1962 | Beste et al. |
| 3,097,192 | 7/1963 | Schilit. |
| 3,184,426 | 5/1965 | Thoma et al. |
| 3,214,411 | 10/1965 | Saunders et al. |
| 3,357,954 | 12/1967 | Kirkaldy. |

OTHER REFERENCES

Hampton et al., Oil and Color Chemists Association Journal, No. 2, vol. 43, February 1960, pages 96, 110 and 111.

MORRIS LIEBMAN, Primary Examiner

P. R. MICHL, Assistant Examiner

U.S. Cl. X.R.

260—32.6, 77.5